(12) United States Patent
Das et al.

(10) Patent No.: US 12,527,660 B2
(45) Date of Patent: Jan. 20, 2026

(54) OPHTHALMIC LENS WITH MITIGATION AND REDUCTION OF DYSPHOTOPSIAS

(71) Applicant: Alcon Inc., Fribourg (CH)

(72) Inventors: Kamal K. Das, Arlington, TX (US); David L. Jinkerson, Benbrook, TX (US); William Jacob Spenner Dolla, Plano, TX (US)

( * ) Notice: Subject to any disclaimer, the term of this patent is extended or adjusted under 35 U.S.C. 154(b) by 38 days.

(21) Appl. No.: 17/661,175

(22) Filed: Apr. 28, 2022

(65) Prior Publication Data

US 2022/0346941 A1 Nov. 3, 2022

Related U.S. Application Data

(60) Provisional application No. 63/181,584, filed on Apr. 29, 2021.

(51) Int. Cl.
*A61F 2/16* (2006.01)

(52) U.S. Cl.
CPC ........ *A61F 2/16* (2013.01); *A61F 2002/1683* (2013.01); *A61F 2002/1696* (2015.04); *A61F 2002/16965* (2015.04); *A61F 2230/0065* (2013.01)

(58) Field of Classification Search
None
See application file for complete search history.

(56) References Cited

U.S. PATENT DOCUMENTS

| | | | |
|---|---|---|---|
| 3,751,138 A * | 8/1973 | Humphrey | B29D 11/00855 359/708 |
| 4,743,254 A | 5/1988 | Davenport | |
| 5,266,074 A | 11/1993 | Nishi et al. | |
| 6,027,531 A | 2/2000 | Tassignon | |
| 8,128,693 B2 | 3/2012 | Tran et al. | |
| 8,647,384 B2 | 2/2014 | Lu | |
| 9,566,150 B2 | 2/2017 | Angelopoulos et al. | |
| 10,285,805 B2 | 5/2019 | Juan, Jr. et al. | |
| 2004/0186241 A1 * | 9/2004 | Gemert | A61F 2/1659 525/329.7 |
| 2005/0021137 A1 | 1/2005 | Blake et al. | |
| 2005/0187621 A1 | 8/2005 | Brady | |
| 2006/0066808 A1 | 3/2006 | Blum et al. | |

(Continued)

FOREIGN PATENT DOCUMENTS

| | | | | |
|---|---|---|---|---|
| CA | 2903598 A1 * | 7/2008 | .......... | A61F 2/1613 |
| JP | 2010520802 A | 6/2010 | | |

(Continued)

OTHER PUBLICATIONS

State et al., "Personalized Eye Models for Negative Dysphotopsia Assessment," Investigative Ophthalmology & Visual Science, Jun. 2021, vol. 62: 503.

*Primary Examiner* — Leslie A Lopez (57) ABSTRACT

An ophthalmic lens may comprise a posterior optic surface, an anterior optic surface, and an optic edge between the posterior optic surface and the anterior optic surface, wherein the optic edge forms a substantially circular perimeter having a thickness that varies periodically. The thickness of the optic edge may vary periodically for at least two cycles. Additionally, or alternatively, the ophthalmic lens may comprise an optic skirt coupled to the optic edge. The optic skirt can be configured to inhibit transmission of light around the optic edge.

35 Claims, 5 Drawing Sheets

(56) References Cited

U.S. PATENT DOCUMENTS

| | | |
|---|---|---|
| 2008/0046076 A1* | 2/2008 | Rombach .............. A61F 2/1632 623/6.34 |
| 2008/0269881 A1 | 10/2008 | Simpson et al. |
| 2010/0234943 A1* | 9/2010 | Portney ................ A61F 2/1618 623/6.23 |
| 2011/0060409 A1 | 3/2011 | Portney |
| 2011/0125261 A1* | 5/2011 | Portney ................ A61F 2/1648 623/6.27 |
| 2011/0153014 A1 | 6/2011 | Zhang et al. |
| 2013/0190868 A1 | 7/2013 | Kahook et al. |
| 2014/0168602 A1 | 6/2014 | Weeber |
| 2015/0342728 A1* | 12/2015 | Simonov ............... A61F 2/1624 623/6.34 |
| 2016/0184088 A1 | 6/2016 | Wanders |
| 2016/0199176 A1 | 7/2016 | Wanders |
| 2016/0317287 A1 | 11/2016 | Silvestrini et al. |
| 2017/0239040 A1 | 8/2017 | Coroneo |
| 2019/0307555 A1 | 10/2019 | Das et al. |
| 2020/0197164 A1 | 6/2020 | Das et al. |
| 2020/0345481 A1 | 11/2020 | Ellis |

FOREIGN PATENT DOCUMENTS

| | | |
|---|---|---|
| JP | 2010526343 A | 7/2010 |
| JP | 2016525432 A | 8/2016 |
| WO | 2020083828 A1 | 4/2020 |

\* cited by examiner

FIG. 4

OPHTHALMIC LENS WITH MITIGATION AND REDUCTION OF DYSPHOTOPSIAS

PRIORITY CLAIM

This application claims the benefit of priority of U.S. Provisional Patent Application Ser. No. 63/181,584 titled "OPHTHALMIC LENS WITH MITIGATION & REDUCTION OF DYSPHOTOPSIAS," filed on Apr. 29, 2021, whose inventors Kamal K. Das and David L. Jinkerson, which is hereby incorporated by reference in its entirety as though fully and completely set forth herein.

TECHNICAL FIELD

The invention set forth in the appended claims relates generally to ophthalmic lenses, including, without limitation, intraocular lenses.

BACKGROUND

The human eye can suffer a number of maladies causing mild deterioration to complete loss of vision. While contact lenses and eyeglasses can compensate for some ailments, ophthalmic surgery may be required for others. In some instances, implants may be beneficial or desirable. For example, an intraocular lens may replace a clouded natural lens within an eye to improve vision.

While the benefits of intraocular lenses and other implants are known, improvements to lenses, delivery systems, components, and processes continue to improve outcomes and benefit patients.

BRIEF SUMMARY

New and useful systems, apparatuses, and methods for eye surgery are set forth in the appended claims. Illustrative embodiments are also provided to enable a person skilled in the art to make and use the claimed subject matter.

For example, some embodiments may comprise or consist essentially of an intraocular lens that can limit the quantity of oblique light bypassing the lens, which can substantially reduce or eliminate negative dysphotopsia. Some embodiments may additionally, or alternatively, limit the angles of oblique light that could reflect off the edge of the lens, which can substantially reduce or eliminate glare. In more particular embodiments, the lens may comprise an optic edge having a wave or dip that can keep light away from the edge and from circumventing or bypassing the lens. Such a feature may also be advantageous for increasing optic diameters without compromising delivery for small-incision surgery. For example, the optic edge may have a wavy profile that extends from about 0.5 millimeters to about 2.5 millimeters from the central optic. Some embodiments may have an optic diameter of at least 7 millimeters.

Additionally, or alternatively, some embodiments may comprise an optic skirt projecting from the optic edge, which may also inhibit the transmission of light around the optic to substantially reduce or eliminate negative dysphotopsia. In some embodiments, the optic skirt may surround the optic outside haptic junctions. In more particular embodiments, the optic skirt may comprise a light absorbing colorant, such as a green dye, a red dye, or both, which may reduce the photopic visual maxima.

More generally, some embodiments of an ophthalmic lens may comprise a posterior optic surface, an anterior optic surface, and an optic edge between the posterior optic surface and the anterior optic surface, wherein the optic edge forms a substantially circular perimeter having a thickness that varies periodically. For example, the anterior optic surface, the posterior optic surface, or both may undulate, thereby forming an optic edge that varies in thickness. In more particular embodiments, the posterior optic surface may undulate in phase or out of phase with the anterior optic surface undulations, and the phase angle may vary. In yet other examples, the surface undulations may have non-uniform patterns of different amplitude and phase at different locations along the circumference of the optic edge. In some embodiments, the thickness of the optic edge may vary periodically for at least two cycles. In more particular embodiments, the thickness may vary sinusoidally. In some embodiments, the thickness may vary between at least two peaks and at least two troughs.

Additionally, or alternatively, some embodiments of the ophthalmic lens may comprise an optic skirt coupled to the optic edge. The optic skirt can be configured to inhibit transmission of light around the optic edge. Some embodiments of the optic skirt may comprise a colorant configured to absorb light. For example, the colorant may comprise a dye configured to reduce photopic visual maxima to further help the transmission of oblique light around the optic. Additionally, or alternatively, the optic skirt may comprise a chromophore to block at least one of ultraviolet light, blue light, and green light. Some embodiments of the optic skirt may comprise or consist essentially of a rubber elastomer or a soft acrylic.

Features, elements, and aspects described in the context of some embodiments may also be omitted, combined, or replaced by alternative features. Other features, objectives, advantages, and a preferred mode of making and using the claimed subject matter are described in greater detail below with reference to the accompanying drawings of illustrative embodiments.

BRIEF DESCRIPTION OF THE DRAWINGS

The accompanying drawings illustrate some objectives, advantages, and a preferred mode of making and using some embodiments of the claimed subject matter. Like reference numbers represent like parts in the examples.

DESCRIPTION OF EXAMPLE EMBODIMENTS

The following description of example embodiments provides information that enables a person skilled in the art to make and use the subject matter set forth in the appended claims, but it may omit certain details already well known in the art. The following detailed description is, therefore, to be taken as illustrative and not limiting.

The example embodiments may also be described herein with reference to spatial relationships between various elements or to the spatial orientation of various elements depicted in the attached drawings. In general, such relationships or orientation assume a frame of reference consistent with or relative to a patient in a position to receive an implant. However, as should be recognized by those skilled in the art, this frame of reference is merely a descriptive expedient rather than a strict prescription.

Figure 1:
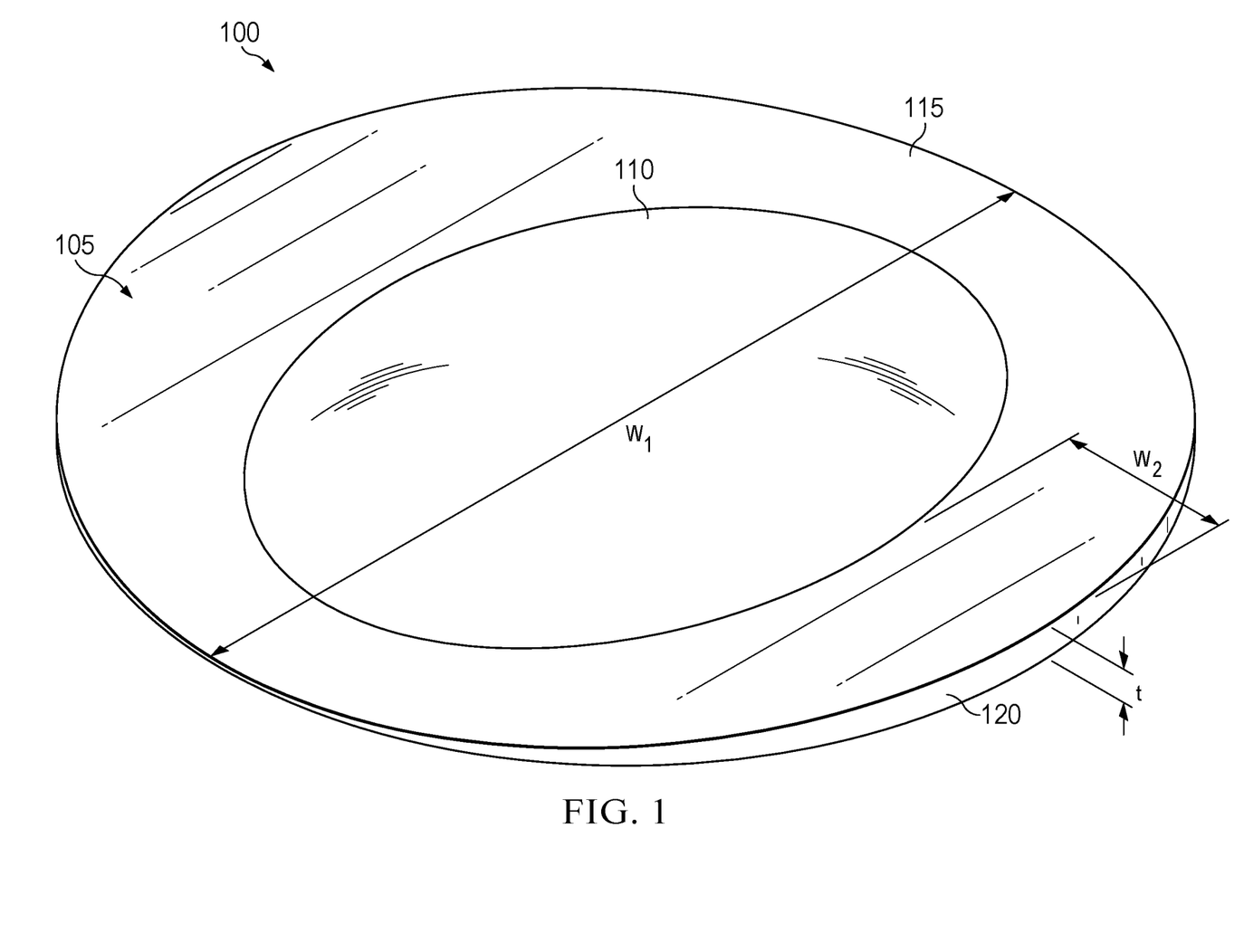
FIG. 1 is an isometric view of an example of a lens suitable for implanting into an eye.

FIG. 1 is an isometric view of an example of a lens 100, illustrating various features that may be associated with some embodiments. As illustrated in the example of FIG. 1, the lens 100 may include an anterior optic surface 105, which may comprise or consist essentially of a central optic 110 and a peripheral optic 115 disposed concentrically around the central optic 110. The lens 100 may have a width $w_1$ that can vary as appropriate to achieve a desired outcome for particular applications. A width $w_1$ of about 6 millimeters to about 8 millimeters may be advantageous for some embodiments. In more particular examples, a width $w_1$ of about 6.5 millimeters to about 7.5 millimeters may be suitable. The peripheral optic 115 has a width $w_2$ that can also vary as appropriate. A width $w_2$ of about 1 millimeter to about 3 millimeters may be advantageous for some embodiments. The lens 100 also generally comprises an optic edge 120, which can form a perimeter having a variable thickness t around the anterior optic surface 105. In the example of FIG. 1, the optic edge 120 forms a substantially circular perimeter.

Figure 2:
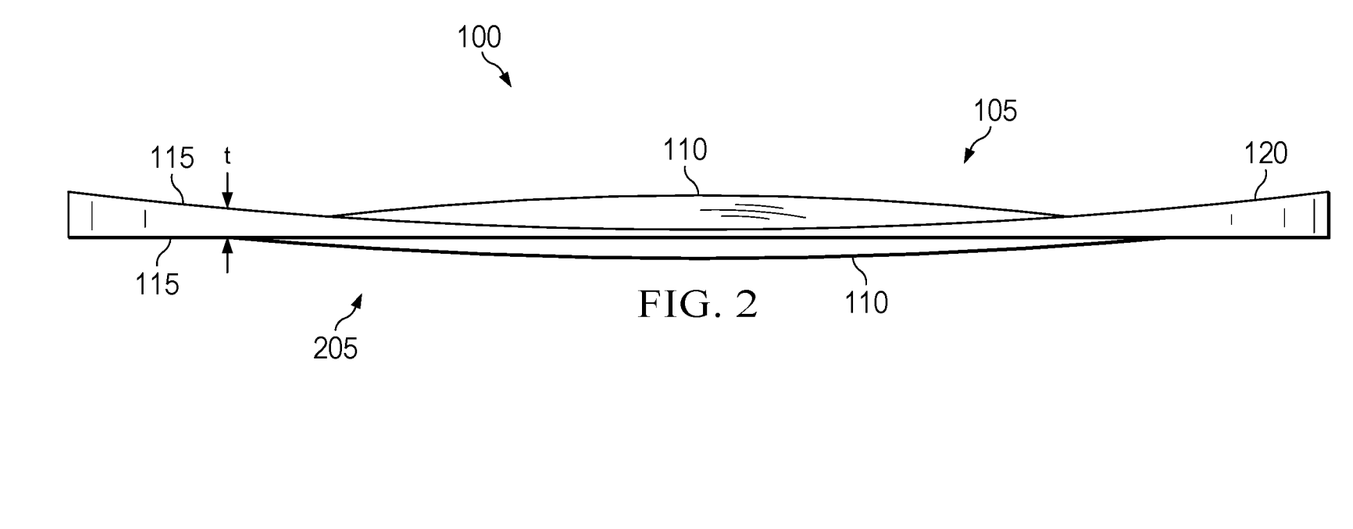
FIG. 2 is a front view of the lens of FIG. 1.
Figure 3:
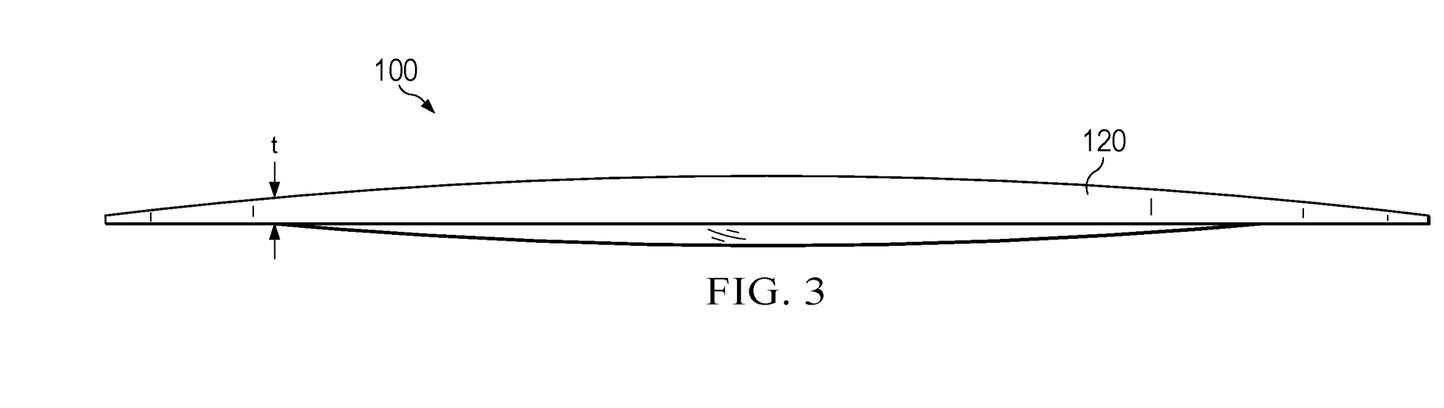
FIG. 3 is a side view of the lens of FIG. 1.

FIG. 2 is a front view of the lens 100 of FIG. 1 and FIG. 3 is a side view of the lens 100 of FIG. 1, illustrating additional details that may be associated with some embodiments. In the example of FIG. 2 and FIG. 3, the lens 100 further comprises a posterior optic surface 205. In some examples, the posterior optic surface 205 may be formed by surfaces of the central optic 110 and the peripheral optic 115 opposite the anterior optic surface 105. As illustrated in the example of FIG. 2 and FIG. 3, the optic edge 120 may join the posterior optic surface 205 and the anterior optic surface 105.

As illustrated in FIG. 2 and FIG. 3, the optic edge 120 may have a thickness t that varies cyclically. More particularly, the example of FIG. 2 illustrates an embodiment in which the anterior optic surface 105 and the posterior optic surface 205 undulate out of phase, so that the thickness t varies from peak-to-peak across this portion of the optic edge 120. The portion of the optic edge 120 illustrated in FIG. 2 has one trough about halfway between the two peaks. FIG. 3 also illustrates one-half of the optic edge 120, and the thickness t varies from trough-to-trough across this portion, increasing to a peak about halfway between the two troughs. Thus, the optic edge 120 in the example of FIG. 2 and FIG. 3 has a thickness t that varies periodically for two cycles. In some examples, the thickness t may vary sinusoidally. Additionally, or alternatively, the thickness t may vary for more than two cycles.

Figure 4:
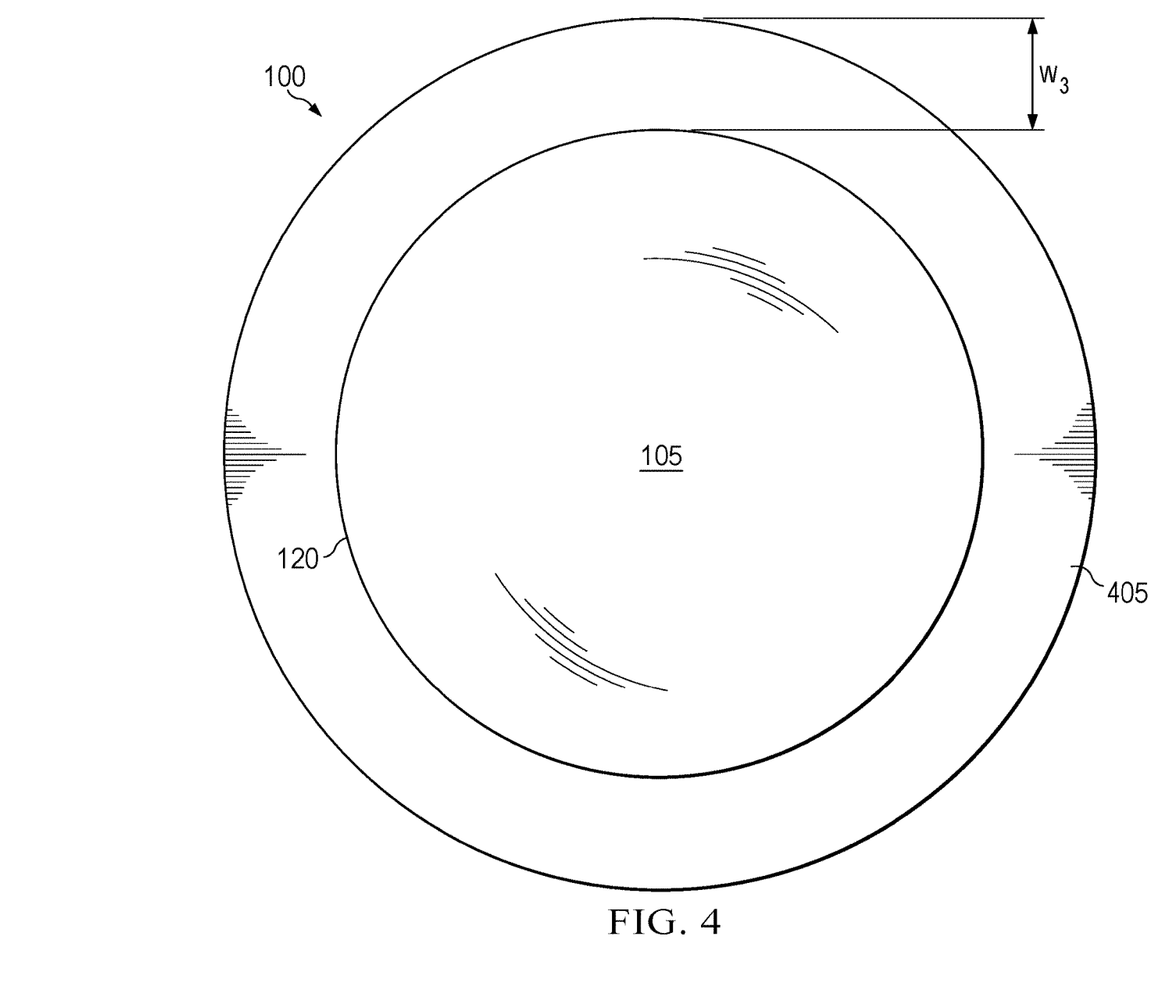
FIG. 4 is a top view of another example of a lens suitable for implanting into an eye.

FIG. 4 is a top view of another example of the lens 100, and more particularly the anterior optic surface 105 of the lens 100, illustrating additional details that may be associated with some embodiments. For example, the lens 100 of FIG. 4 comprises an optic skirt 405, which may be coupled to the optic edge 120. The optic skirt 405 may be configured to inhibit transmission of light around the optic edge 120. The optic skirt 405 may have a width $w_3$ that can vary in different embodiments. For example, a width $w_3$ in a range of about 0.5 millimeters to about 1 millimeter may be suitable for some embodiments. In some embodiments, the optic skirt 405 may comprise a colorant configured to absorb light. For example, the optic skirt 405 may have a colorant configured to absorb light at wavelengths of about 550-555 nanometers. In more particular embodiments, the colorant may comprise a dye configured to reduce the photopic visual maxima to help the transmission of oblique light around the optic. Additionally, or alternatively, the optic skirt 405 may comprise a chromophore that can block at least one of ultraviolet light, blue light, and green light.

Suitable materials for the optic skirt 405 may include a rubber elastomer or a soft acrylic, which may have tensile properties suitable for folding. More particular examples of suitable materials may include butyl rubber, latex rubber, natural rubber, pure gum rubber, neoprene rubber, acrylonitrile rubber, styrene-butadiene rubber, ethylene-propylene diene monomer rubber, acrylonitrile-butadiene-styrene (ABS) rubber, epichlorohydrin rubber, hypalon rubber, silicone rubber and siloxane elastomers, such as poly(dimethylsiloxane), polyurethane rubber, viton rubber, ethylene-butylene rubber, isobutylene rubber and elastomers of polyphosphazenes, like poly (bistrifluorethoxyphosphazene) oly (dimethylphosphazene) or poly(phenylmethylphosphazene).

In some embodiments, the optic skirt 405 may be fixed to the optic edge 120 during the process of manufacturing the lens 100. For example, the optic skirt 405 may be placed into a lens wafer, and a lens monomer formulation can be cast into the wafer. The monomer formulation can cover the inner edge of the optic skirt 405 above and below, thereby sandwiching the optic skirt 405 within the optic edge 120. For example, an optic skirt 405 having a width $w_3$ of 1 millimeter could be produced by inserting 0.5 millimeters of a 1.5-millimeter ring into the wafer, which provide a skirt junction of 0.5 millimeters.

Figure 5:
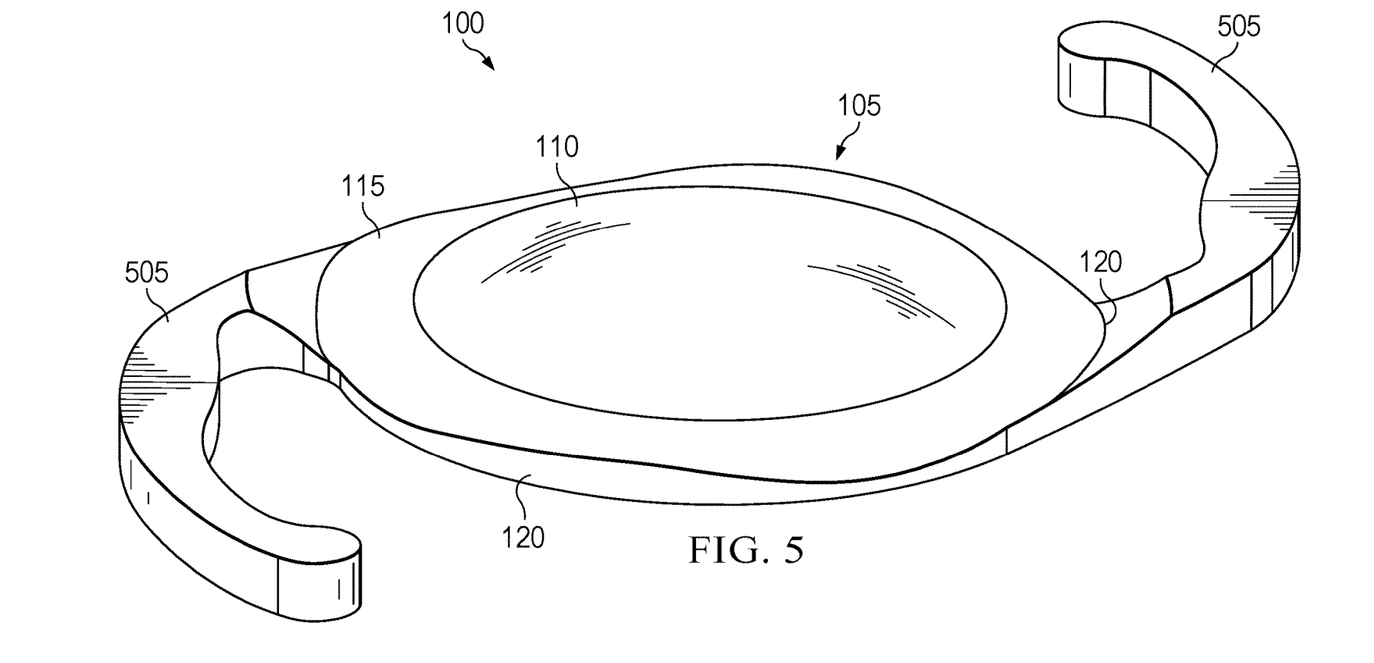
FIG. 5 is an isometric view of another example of a lens for implanting into an eye.

FIG. 5 is an isometric view of another example of the lens 100, illustrating various features that may be associated with some embodiments. For example, the lens 100 comprises one or more haptics 505 for positioning the central optic 110 and the peripheral optic 115 within an eye. As illustrated in the example of FIG. 5, some embodiments of the haptics 505 may extend from opposing sides of the peripheral optic 115. Additionally, or alternatively, the haptics 505 may be coupled to the optic edge 120 where the thickness t is at a maximum, which can increase the mechanical stability of the lens, increase the rotational stability of the lens, allow the total volume to be decreased, and improve axial placement of the optic body to optimize refractive outcomes. FIG. 5 also illustrates an embodiment in which only the anterior optic surface 105 undulates.

Figure 6:
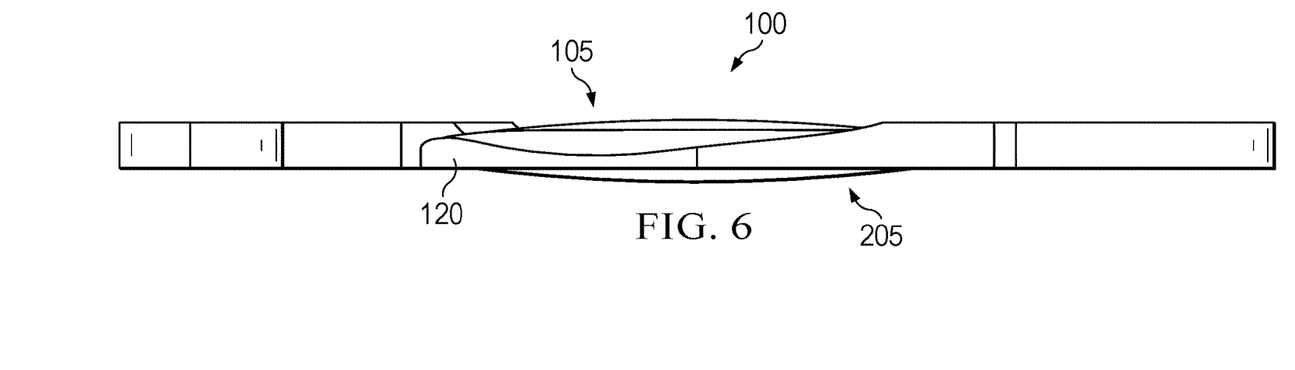
FIG. 6 is a side view of the lens of FIG. 5.

FIG. 6 is a side view of the lens 100 of FIG. 5, illustrating additional details that may be associated with some embodiments. For example, FIG. 6 illustrates in greater detail the profile of the optic edge 120 formed by the undulations of the anterior optic surface 105 and the substantially planar posterior optic surface 205. As illustrated, the planar configuration of the posterior optic surface 205 can form a sharp edge, which can decrease the risk of posterior capsular opacification.

Figure 7:
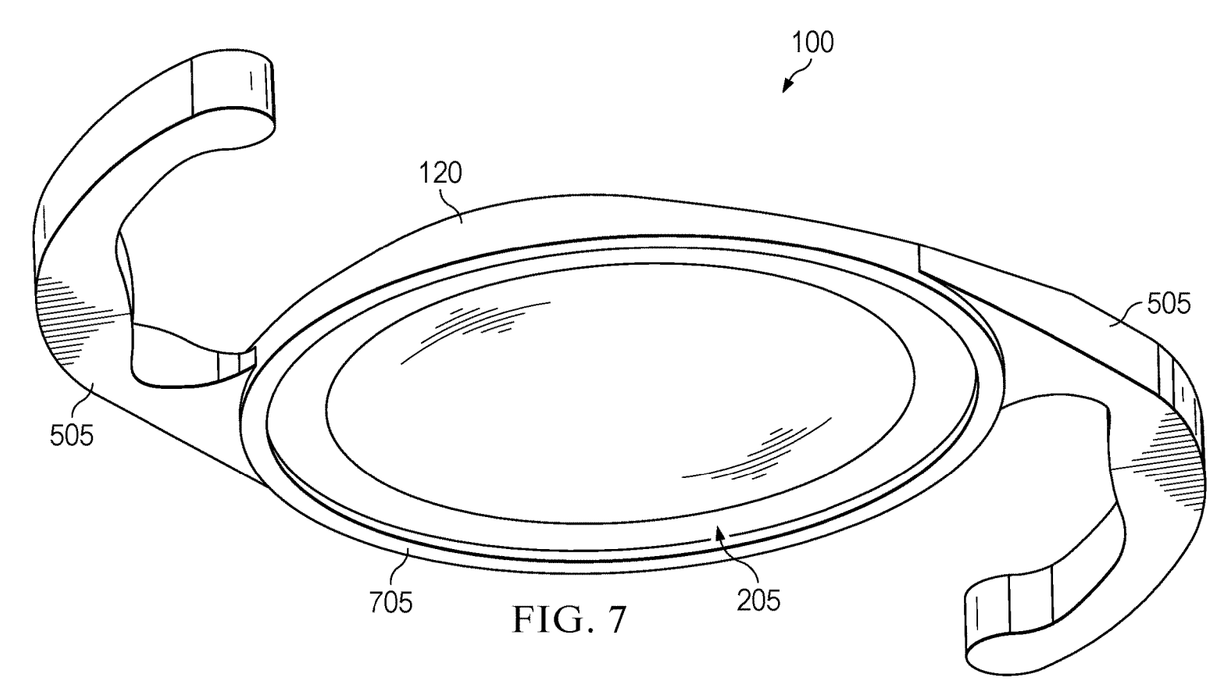
FIG. 7 is an isometric bottom view of another example of a lens for implanting into an eye.

FIG. 7 is an isometric bottom view of another example of the lens 100, illustrating various features that may be associated with some embodiments. In FIG. 7, for example, the lens 100 comprises a ring 705 on the posterior side of the lens 100. As illustrated in the example of FIG. 7, the ring 705 may be continuous and may be coupled to the posterior optic surface 205. The posterior optic surface 205 of FIG. 7 is substantially planar. In general, the ring 705 may be placed either along the perimeter of the posterior optic surface 205 or inward to decrease the risk of posterior capsular opacification. In some embodiments, an additional barrier may be added at the junction between optic edge 120 and the haptics 505, which may further reduce potential posterior capsular opacification and mitigate glare or other visual disturbances due to the blocking of far off-axis light.

Figure 8:
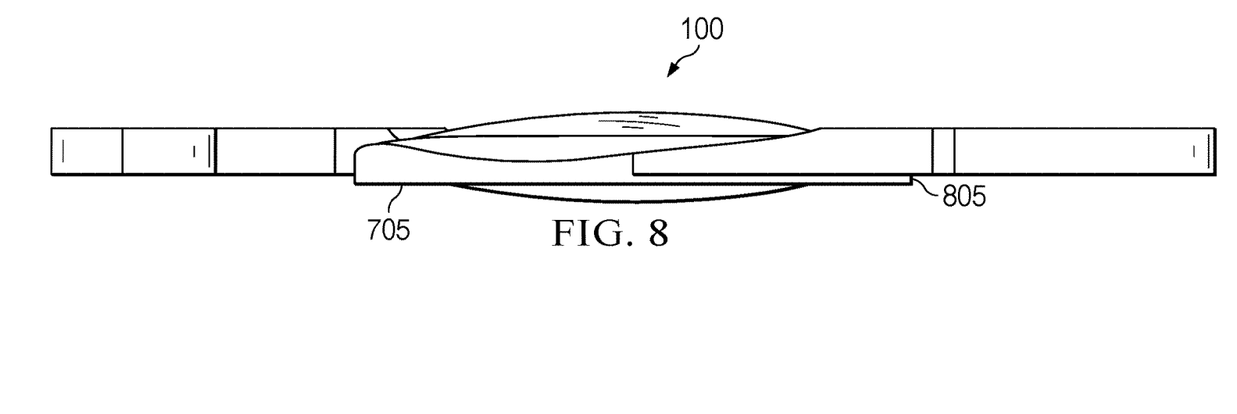
FIG. 8 is a side view of the lens of FIG. 7.

FIG. 8 is a side view of the lens 100 of FIG. 7, further illustrating the ring 705. In the example of FIG. 8, the perimeter of the ring 705 may form an edge 805 that is substantially orthogonal to the posterior optic surface 205 (as shown in FIG. 7). The edge 805 can significantly reduce the risk of posterior capsular opacification in some embodiments.

The systems, apparatuses, and methods described herein may provide significant advantages. For example, the lens 100 can substantially reduce or eliminate negative dysphotopsia, edge glare, or both. In more particular embodiments, the lens 100 may have an optic edge with a variable thickness, which can keep light away from the optic edge and from circumventing or bypassing the lens 100. Out of phase undulating patterns can result in combinations that also mitigate visual disturbances. The variable thickness of the optic edge may additionally reduce the overall volume of the lens 100, which can allow the optic diameter to be increased without increasing the size of an incision needed to insert the lens 100. Increasing the size of the optic can increase the size of pupil image formation and can also result in higher mechanical stability without affecting spherical aberration correction. In some embodiments, increasing the size of the optic can also increase correction of spherical aberration and other higher aberrations for patients with large pupils.

Additionally, or alternatively, some embodiments of the lens 100 may have an optic skirt projecting from the optic edge, which can inhibit the transmission of light around the optic, thereby substantially reducing or eliminating negative dysphotopsia.

While shown in a few illustrative embodiments, a person having ordinary skill in the art will recognize that the systems, apparatuses, and methods described herein are susceptible to various changes and modifications that fall within the scope of the appended claims. Moreover, descriptions of various alternatives using terms such as "or" do not require mutual exclusivity unless clearly required by the context, and the indefinite articles "a" or "an" do not limit the subject to a single instance unless clearly required by the context. Components may be also be combined or eliminated in various configurations for purposes of sale, manufacture, assembly, or use. For example, in some configurations, features of the optic edge 120 and the optic skirt 405 can be combined in various ways.

The claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described in the context of some embodiments may also be omitted, combined, or replaced by alternative features serving the same, equivalent, or similar purpose without departing from the scope of the invention defined by the appended claims.

What is claimed is:

1. An ophthalmic lens for implanting into an eye, the ophthalmic lens comprising:
a single optic having a posterior optic surface and an anterior optic surface; and
an optic edge that couples the posterior optic surface and the anterior optic surface, the optic edge forming a substantially circular perimeter around the single optic and having a thickness that varies periodically for at least two cycles;
wherein the thickness is oriented substantially parallel to an optical axis of the ophthalmic lens.

2. The ophthalmic lens of claim 1, wherein the thickness varies sinusoidally.

3. The ophthalmic lens of any preceding claim, wherein:
the anterior optic surface comprises a central optic and a peripheral optic.

4. The ophthalmic lens of claim 3, wherein the peripheral optic has a width in a range of 0.5 millimeters to 3 millimeters.

5. The ophthalmic lens of claim 1 or claim 2, further comprising an optic skirt coupled to the optic edge, the optic skirt configured to inhibit transmission of light around the optic edge.

6. The ophthalmic lens of claim 5, wherein the optic skirt comprises a colorant configured to absorb light.

7. The ophthalmic lens of claim 6, wherein the colorant comprises a dye configured to reduce photopic visual maxima.

8. The ophthalmic lens of claim 1 or claim 2, wherein the posterior optic surface is substantially planar.

9. The ophthalmic lens of claim 8, further comprising a ring on the posterior optic surface.

10. The ophthalmic lens of claim 8, further comprising a ring coupled to a perimeter of the posterior optic surface.

11. The ophthalmic lens of claim 1, further comprising one or more haptics extending from the optic edge.

12. The ophthalmic lens of claim 11, wherein the haptics extend from the optic edge.

13. The ophthalmic lens of claim 11 or claim 12, wherein the haptics are coupled to opposing sides of the optic edge.

14. The ophthalmic lens of claim 11 or claim 12, wherein the haptics are coupled to the optic edge where the thickness of the optic edge is at a maximum.

15. A lens for implanting into an eye, the lens comprising:
a single optic having a posterior optic surface and an anterior optic surface; and
an optic edge that couples the posterior optic surface and the anterior optic surface, the optic edge having a thickness that varies between at least two peaks and at least two troughs;
wherein the thickness is oriented substantially parallel to an optical axis of the lens.

16. The lens of claim 15, wherein the optic edge forms a substantially circular perimeter around the posterior optic surface and the anterior optic surface.

17. The lens of any of claims 15-16, wherein:
the anterior optic surface comprises a central optic and a peripheral optic.

18. The lens of claim 17, wherein the peripheral optic has a width in a range of 0.5 millimeters to 3 millimeters.

19. The lens of claim 15 or claim 16, further comprising an optic skirt coupled to the optic edge, the optic skirt configured to inhibit transmission of light around the optic edge.

20. The lens of claim 19, wherein the optic skirt comprises a colorant configured to absorb light.

21. The lens of claim 20, wherein the colorant comprises a dye configured to reduce the photopic visual maxima.

22. The lens of claim 15 or claim 16, wherein the posterior optic surface is substantially planar.

23. The lens of claim 22, further comprising a ring on the posterior optic surface.

24. The lens of claim 22, further comprising a ring coupled to a perimeter of the posterior optic surface.

25. The lens of claim 15 or claim 16, further comprising one or more haptics extending from the optic edge.

26. The lens of claim 25, wherein the haptics extend from opposing sides of the optic edge.

27. The lens of claim 25, wherein the haptics are coupled to the optic edge where the thickness of the optic edge is at a maximum.

28. An ophthalmic lens for implanting into an eye, the ophthalmic lens comprising:
   a single central optic; and
   a peripheral optic disposed concentrically around the central optic, the peripheral optic comprising a posterior optic surface, an anterior optic surface, and an optic edge that couples the posterior optic surface and the anterior optic surface;
   wherein the anterior optic surface undulates so that the optic edge has a thickness that varies and;
   wherein the thickness is oriented substantially parallel to an optical axis of the ophthalmic lens.

29. The ophthalmic lens of claim 28, wherein the thickness varies sinusoidally.

30. The ophthalmic lens of claim 28 or claim 29, wherein the posterior optic surface is substantially planar.

31. The ophthalmic lens of claim 28 or claim 29, further comprising a ring on the posterior optic surface.

32. The ophthalmic lens of claim 28 or claim 29, further comprising a ring coupled to a perimeter of the posterior optic surface.

33. The ophthalmic lens of claim 28 or claim 29, further comprising one or more haptics extending from the peripheral optic.

34. The ophthalmic lens of claim 33, wherein the haptics are coupled to the peripheral optic where the thickness of the optic edge is at a maximum.

35. The ophthalmic lens of claim 28 or claim 29, wherein the peripheral optic has a width in a range of 1 millimeter to 3 millimeters.

\* \* \* \* \*